United States Patent
Dressler et al.

(10) Patent No.: US 8,019,911 B2
(45) Date of Patent: Sep. 13, 2011

(54) SYSTEM AND METHOD FOR TESTING AND CALIBRATING A CONTROL UNIT USING AN ADAPTATION UNIT

(75) Inventors: Marc-Andre Dressler, Horn (DE); Hans-Guenter Limberg, Paderborn (DE); Andre Rolfsmeier, Bad Lippspringe (DE)

(73) Assignee: DSpace Digital Signal Processing and Control Enineering GmbH, Paderborn (DE)

( * ) Notice: Subject to any disclaimer, the term of this patent is extended or adjusted under 35 U.S.C. 154(b) by 502 days.

(21) Appl. No.: 12/101,640

(22) Filed: Apr. 11, 2008

(65) Prior Publication Data

US 2008/0256268 A1   Oct. 16, 2008

(30) Foreign Application Priority Data

Apr. 13, 2007   (DE) .................. 10 2007 017 865

(51) Int. Cl.
*G06F 13/00* (2006.01)
*G01C 22/00* (2006.01)
(52) U.S. Cl. ............... 710/31; 710/33; 701/24
(58) Field of Classification Search .............. None
See application file for complete search history.

(56) References Cited

U.S. PATENT DOCUMENTS

| | | | |
|---|---|---|---|
| 4,853,850 A * | 8/1989 | Krass et al. | 701/35 |
| 5,758,300 A | 5/1998 | Abe | |
| 6,241,534 B1 * | 6/2001 | Neer et al. | 439/76.1 |
| 6,367,032 B1 | 4/2002 | Kasahara | |
| 6,662,087 B1 * | 12/2003 | Liebl et al. | 701/29 |
| 7,324,550 B2 * | 1/2008 | Klose et al. | 370/466 |
| 2003/0096537 A1 * | 5/2003 | Belopolsky | 439/676 |
| 2003/0171905 A1 | 9/2003 | Wagner et al. | |
| 2004/0103398 A1 | 5/2004 | Agarwala et al. | |
| 2005/0090940 A1 | 4/2005 | Pajakowski et al. | |
| 2006/0226702 A1 * | 10/2006 | Ando | 307/9.1 |
| 2008/0065239 A1 | 3/2008 | Leinfellner et al. | |

FOREIGN PATENT DOCUMENTS

| | | |
|---|---|---|
| DE | 19522937 A1 | 1/1996 |
| DE | 10106504 A1 | 8/2002 |
| DE | 10325425 A1 | 12/2004 |
| DE | 102004027033 A1 | 10/2005 |
| DE | 60118089 T2 | 10/2006 |
| WO | 2005091089 | 9/2005 |

OTHER PUBLICATIONS

Transperfect Translations, "English Translation of WO2005/091089", Translated on Oct. 9, 2006, pp. 1-26.*

(Continued)

*Primary Examiner* — Tariq Hafiz
*Assistant Examiner* — Dayton Lewis-Taylor
(74) *Attorney, Agent, or Firm* — Leydig, Voit & Mayer, Ltd.

(57) ABSTRACT

A system and method for testing and calibrating a control unit including a microcontroller includes an influencing device and an adaptation unit. The adaptation unit includes a memory that can store at least part of a data of a data communication between the influencing device and the control unit. The memory can be read from and/or written to by the microcontroller of the control unit when the control unit is in an on state.

23 Claims, 2 Drawing Sheets

OTHER PUBLICATIONS

CDRInfo.com, "MRAM memory: Is it the future?", Jun. 17, 2005, pp. 1-6 http://www.cdrinfo.com/sections/news/details.aspx?newsid=14211.*

J. Novak and P. Kocourek, "Automated Testing of Electronic Control Units Compatibility in Vehicle CAN Networks", IEEE ISIE 2005, Jun. 20-23, 2005, pp. 1423-1428.*

Jianhui Luo; Pattipati, K.R.; Liu Qiao; Chigusa, S.; , "An Integrated Diagnostic Development Process for Automotive Engine Control Systems," Systems, Man, and Cybernetics, Part C: Applications and Reviews, IEEE Transactions on , vol. 37, No. 6, pp. 1163-1173, Nov. 2007 doi: 10.1109/TSMCC.2007.900659.*

Office Action issued in Patent Application DE 10 2007 017 865.6, mail date Feb. 18, 2009.

Randy Frank, "The Newest Car Models-Software", Ward's Auto Electronics, Sep./Oct. 2005, pp. 12, 13, 15, 16, 18 and 42.

Catalog 2004, dSPACE, Calibration System, 2004, pp. 84-85.

Catalog 2006, dSPACE, Calibration Hardware, "Generic Serial Interface DCI-GSI1", 2006, pp. 430-433.

Catalog 2004, dSPACE, Calibration Hardware, "Generic Memory Emulator DCI-GME1", pp. 292-293.

The Nexus 5001 Forum, Standard for a Global Embedded Processor Debug Interface, Version 2.0, 2003, Industry Standards and Technology Organization IEEE-ISTO, USA, pp. 1-166.

"Generic Serial Interface DCI-GSI1", Calibration Hardware, dSPACE Catalog 2006, Germany, pp. 430-432.

* cited by examiner

SYSTEM AND METHOD FOR TESTING AND CALIBRATING A CONTROL UNIT USING AN ADAPTATION UNIT

Priority is claimed to German Patent Application DE 10 2007 017 865.6, filed Apr. 13, 2007, the contents of which is incorporated herein by reference as if set forth in its entirety.

The present invention relates to a system and method for calibrating and testing a control unit using an adaptation unit disposed between the control unit and an influencing device.

BACKGROUND

A tendency that has been observed for many years in the manufacture of not only automobiles, but also in other sectors in the design and manufacture of vehicles of any type, and in all other mechanical engineering and plant construction sectors, is that the products contain more and more electronics. The contribution of electronics to automotive value creation is already about 35 percent, with an upward tendency. A large portion of this contribution to value creation is related to control units which monitor the various devices of the overall products. These traditional control units are generally permanently programmed, and cannot be modified at all, or only to a very limited extent, at a later time.

However, in order to adapt the control units to their respective environments, it is necessary to be able to make modifications to the control unit in order to determine the optimum operating parameters for a particular application. Such modifications relate mainly to changes to boundary conditions, i.e., to changes to the data stored in the memories of the control unit.

In order to be able to carry out suitable tests on the respective control units, one can use influencing devices, which allow the desired modifications to be made to the control unit.

Influencing devices are known in the field and are used primarily in applied research and industrial development where the aim is to develop control units and bring them into use. An example of an influencing device is described in International Patent Application WO 2005/091089 A1.

In the following, the term "control unit" will be understood to include all types of electronic devices used for influencing technical-physical processes. Such a control unit usually includes at least one processing unit, for example in the form of a microprocessor or microcontroller. The control unit also includes a memory and input/output (I/O) interfaces to be able to perform calculations as a function of internally stored parameters or internal operands and/or measured (or at least externally provided) variables and, at the same time, to be able to influence external processes by outputting electrical signals. Thus, from a control engineering point of view, control units do not just operate as open-loop controllers. Rather, they are, in particular, also capable of performing complex closed-loop control tasks. Whenever the description below refers to control units, controllers, and the process of controlling, it is understood that these terms also include devices and processes according to the more general definition given above.

Moreover, the following description frequently refers to various microcontrollers, which will be understood to mean electronic processing units having electronic memory associated therewith, irrespectively of whether the memory is partially or completely implemented together with the processing unit in a single part, or whether the processing unit and the associated memory are separate parts.

The use of influencing devices is illustrated in the following description of the development process that control units go through in practice, at least with respect to complex tasks.

Any control engineering task begins with the mathematical modeling and simulation of a technical-physical process upon which a desired dynamic behavior is to be imposed. Based on the resulting abstract mathematical model, it is possible to test different control concepts, again available exclusively as a mathematical model concept, within the framework of numerical simulations. This stage is the phase of modeling and controller design, based mostly on computer-aided modeling tools.

In a second step, the controller designed in the mathematical model is transferred to a real-time capable simulation unit, which usually has a much better performance than a conventional standard control unit in terms of both computing power and I/O capabilities, and which is in an interactive communication with the real physical process. Since the transfer of the abstractly-formulated controller from a modeling tool to the simulation unit occurs substantially automatically, the second phase is also referred to as rapid control prototyping (RCP) or function prototyping.

Once the control engineering task is achieved by the controller operating in the simulation unit, the control algorithm is transferred, during controller implementation, to the standard control unit to be ultimately used in practice, usually in a fully automatic manner.

Frequently, the control unit, which in principle can now be used in a real process, is initially subjected to a test before it is used in practice. In such a test, the real process, with which the control unit is ultimately intended to interact with, is partially or completely simulated by a real-time capable simulation unit, and the control unit is simulated by a signal test pattern (e.g., hardware-in-the-loop simulation). The control unit tested in this manner is ultimately used in the real process and operated interactively therewith.

In spite of the previously performed comprehensive testing, it is usually necessary to make adjustments to the control unit, or to the functions implemented in the control unit. For this purpose, first of all, the state of the control unit, i.e., all data that is read or output or internally used by the control unit, must be capable of being promptly monitored, recorded, and analyzed through data acquisition. Secondly, the parameters or sets of parameters, i.e., the characteristic values, curves, and maps, on which the functions/control algorithms are based, must be capable of being changed through writing access to the memory of the control unit. The above-described processes are altogether referred to as control unit applications.

In cases where not only parameters of the functions of the control unit, i.e., data stored in the memory of the control unit, but also the actual functions implemented in the control unit are to be changed for testing purposes, the so-called "function bypassing" is used. During function bypassing, the control unit signals to a real-time capable simulation unit that a control unit function has been called, but does not itself perform the function. Instead, the control unit receives and uses the result calculated in the simulation unit for purposes of substitution. Thus, the control unit function is bypassed.

In both the control unit application and function bypassing scenarios described above, it is necessary to provide a special access to the control unit, via which the control unit can be monitored and actively influenced. This is the task of influencing devices.

In practice, various methods are known for accessing control units via influencing devices. These methods include access via a parallel interface, access via a serial interface, or access via a special debug interface, frequently in addition to other serial and/or parallel interfaces. The debug interface itself may be in the form of a serial or parallel interface, or be a combination of these two types.

Depending on the design of the control unit, it may be necessary to interfere with the hardware of the control unit when using a parallel interface, because frequently the influencing device operates as a memory emulator.

It is known that a memory, or selected memory areas of the memory, of a memory emulator may take the place of a memory device or memory area of the control unit, or be accommodated in a slot especially provided for this purpose on the circuit board of the control unit. After the memory emulator is connected to the control unit, a control unit microcontroller accesses the memory contents of the memory emulator via the address and data buses.

Modern control units are increasingly equipped with microcontrollers having a debug interface, such as NEXUS (IEEE-ISTO 5001: "The NEXUS 5001 Forum Standard for a Global Embedded Processor Debug Interface", 2003).

Debug interfaces offer far-reaching possibilities for monitoring and influencing microcontroller states and allow for run-time monitoring and control (e.g., debugging) of the microcontroller, making it possible, in particular, to trace the execution of program code and the data accessed and modified in the process. Because debug interfaces form an integral part of the microcontroller hardware, they allow the microcontroller to be accessed much faster than is possible when using a software-based communications interface.

Thus, using a suitable interface instruction set, the debug interface of a control unit makes it possible to automatically read out and actively influence the state of a control unit microcontroller, and, to some extent, also the states of units associated therewith in the control unit (e.g., the state of its external memory).

The term "control unit debug interface" as used herein will be understood to also include interfaces which are not primarily intended as "debug interfaces" and therefore are not explicitly referred to as such, but which offer such monitoring and influencing capabilities with respect to the control unit microcontroller and the electronic units associated therewith.

International Patent Publication WO 2005/091089 A1 describes the use of the control unit debug interface for data exchange between the influencing device and the control unit to be influenced.

It is also known that the application of a control unit having a control unit debug interface can be done using an influencing device (see, dSPACE catalog 2006, pp. 430-432, influencing device DCI-GSI1) which uses the control unit debug interface (for example, the Nexus interface) for influencing the control unit. Until now, the exchange of data (e.g., protocol information, variables, constants, instructions, functions, programs, etc.) between the control unit and the influencing device could only be carried out via such debug interfaces when the control unit was ON.

In traditional systems, the influencing device and control unit are directly coupled via a debug interface. However, in an arrangement where the influencing device and the control unit are directly coupled via a debug interface, data exchange cannot even start when the control unit is OFF.

One of the reasons for this is that certain protocol information must be exchanged before payload data can be exchanged between the debug interface of the influencing device and the debug interface of the control unit. In the special case where a control unit microcontroller located in the control unit can be turned off independently of the control unit, the operational readiness of the debug interface of the control unit is usually still linked to the operational readiness of the control unit microcontroller.

SUMMARY

However, the work of development and test engineers would be enormously facilitated if the memory contents associated with the microcontroller of the control unit could be influenced via the influencing device and via the debug interface even when the control unit is OFF. The capability of influencing the memory (e.g., RAM memory) associated with the control unit microcontroller via the debug interface already before or during activation of the control unit would be beneficial especially with respect to calibration and testing of the control unit.

An embodiment of the present invention provides a system and method for testing and calibrating a control unit. The control unit includes a microcontroller and has an on/off state. In the embodiment, an influencing device and an adaptation unit is also provided. The adaptation unit has a memory that can store at least part of the data of a data communication between the influencing device and the control unit. The memory can be read from and/or written to by the microcontroller when the control unit is in the on state.

BRIEF DESCRIPTION OF THE DRAWINGS

Further features and advantages of the present invention will become apparent from the following description of the accompanying figures without being intended to limit the invention in any way, in which.

DETAILED DESCRIPTION

Figure 1:
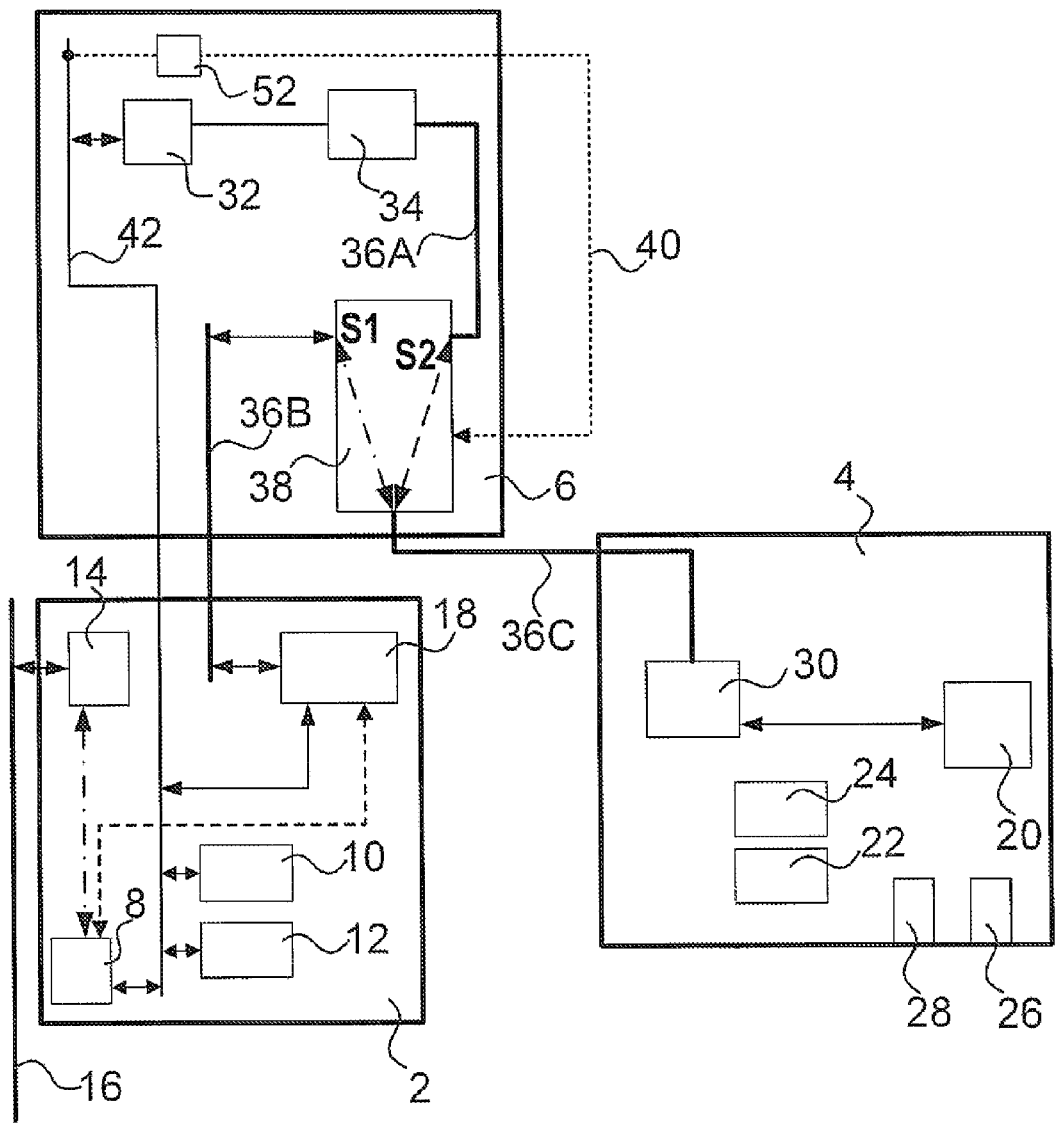
FIG. 1 illustrates a schematic view of a test system according to an embodiment of the present invention.

In accordance with an embodiment of the present invention, an adaptation unit is optionally provided in the data link between a control unit and at least one influencing device for influencing the control unit. The adaptation unit includes at least one memory which can store at least part of the data of the data communication between the influencing device and the control unit, and which can be read from and/or written to by the microcontroller of the turned-on control unit.

Such an adaptation unit according to an embodiment of the present invention allows the memory contents associated with the microcontroller of the control unit to be influenced via the influencing device when the control unit is OFF, so that the memory (e.g., RAM memory) associated with the control unit microcontroller can be influenced via the debug interface before or during activation of the control unit, for example, for purposes of calibration and testing of the control unit.

One of the reasons for this is that certain protocol information must be exchanged before payload data can be exchanged between the influencing device and the control unit. In an embodiment of the present invention, the adaptation unit signals to the influencing device that the control unit is ON, even if the control device is not turned on, or not fully turned on. In addition, the adaptation unit enables the influencing device to exchange data via the system's bus just as if the control unit were ON and without having to make changes to the usage of the bus. This means that the protocol used for controlling the bus remains unchanged. For this purpose, the adaptation unit according to an embodiment of the present invention simulates portions of the bus, or the entire bus, and the entire bus protocol, respectively. In addition, the adaptation unit according to an embodiment of the present invention allows relevant data to be exchanged even when the control unit is OFF.

The adaptation unit according to an embodiment of the present invention may further feature a connecting element for alternatively connecting the influencing device and the control unit via a direct data link, or with interposition of the memory in the adaptation unit. The connecting element can be switchable independently of the state of the control unit or of signals of the control unit or influencing device. The connecting element may also include at least one programmable unit, preferably in the form of a field programmable gate array device, which is referred to as a "FPGA" by those skilled in the art. This acronym will be used hereinafter. Alternatively, the connecting element may also be implemented with a reprogrammable hardware device, also preferably in the form of an FPGA.

Finally, the connecting element may also be a microcontroller device, or be implemented as a circuit including discrete active and passive electronic components. The memory provided in the adaptation unit is preferably a static RAM (SRAM) memory, called "SRAM" hereinafter. However, alternative memory types could also be used for the adaptation unit. These alternative memory types are not limited to volatile memory types, but may also be non-volatile memory types. Alternative memories include, for example, MRAM memory or FRAM memory. The adaptation unit according to an embodiment of the present invention is also preferably provided with at least one debug interface for data connection to the influencing device and to the control unit. The debug interface preferably corresponds to the interfaces of the control unit and the influencing device, and is also preferably a NEXUS interface.

As discussed previously, debug interfaces offer far-reaching possibilities for monitoring and influencing microcontroller states and allow for run-time monitoring and control (e.g., debugging) of the microcontroller, making it possible, in particular, to trace the execution of program code and the data accessed and modified in the process. Because debug interfaces form an integral part of the microcontroller hardware, they allow the microcontroller to be accessed much faster than is possible via a software-based communications interface. Thus, using a suitable interface instruction set, the debug interface of a control unit makes it possible to automatically read out and actively influence the state of a control unit microcontroller, and to some extent also the states of units associated therewith in the control unit (e.g., the state of its external memory).

Furthermore, in an embodiment of the present invention, the adaptation unit may form an integral part of the influencing device. Usually, adaptation elements and influencing devices are designed to be as small as possible and separate from an operator control unit, for example, because they are mounted within a motor vehicle. However, it is perfectly conceivable that the inventive adaptation unit, the influencing unit, and the operator control unit could be integrated as one unit of hardware.

An embodiment of the present invention also provides a method for operating a test system including at least one control unit and at least one influencing device which is connected to the control unit via a data link and used for influencing the control unit. The test method includes providing an external memory that is accessible by the control unit as its own memory and providing protocol data on a debug channel. Control data and/or payload data and/or instructions on the data link between the control unit and the influencing device and/or between the adaptation unit and the influencing device is also provided. A communication between the external memory and the influencing device is established using either communication protocol data of the control unit, or communication protocol data which corresponds to that of the control unit. Control data and/or payload data and/or instructions for the control unit from the influencing device is written into the external memory. The control unit can be started while reading the external memory, and the communication can be transmitted to the control unit and the influencing device.

In an embodiment according to the present invention, the connection between the external memory of the adaptation unit and the control unit via the microcontroller bus and/or the connection between the external memory of the adaptation unit and the influencing device is/are capable of being disconnected. Moreover, the control unit and/or the influencing device and/or the adaptation unit may each be provided as separate modules that can then be mechanically and/or electrically coupled to each other via plug-in connections.

In another embodiment according to the present invention, the adaptation unit may remain connected to the control unit during the entire control unit test phase, which may last several days, while, at the same time, the control unit uses the external memory of the adaptation unit, either permanently or temporarily.

A system according to an embodiment of the present invention is also provided. The system includes at least one control unit having at least one control unit microcontroller. The system also includes at least one control unit debug interface, and an influencing device for influencing the control unit. The influencing device includes at least one programmable unit, at least one data transmission interface for connecting the influencing device to an operator control unit, and at least one influencing device debug interface which can be used for connecting the influencing device to the debug interface of the control unit.

FIG. 1 illustrates a control unit 2, an influencing device 4, and an adaptation unit 6 connected to the control unit 2 and to the influencing device 4.

As shown in FIG. 1, control unit 2 also includes a microcontroller core 8 (microcontroller core 8 is essentially the core of the microcontroller of control unit 2), a flash memory 10, and a RAM memory 12.

In addition, control unit 2 preferably includes a CAN interface 14, via which the control unit communicates with CAN bus 16, for example, in a vehicle. It is to be understood that other interfaces, usually standard ones, to other control units may be additionally provided, depending on the use of control unit 2.

Control unit 2 further includes a debug interface 18, via which the control unit 2 communicates with influencing device 4 using the adaptation unit 6. Debug interface 18 is preferably a Nexus interface.

Influencing device 4, in turn, includes an influencing device microcontroller 20, a ROM memory 22 and a RAM memory 24. Alternatively, a so-called "flash memory" or an EPROM or an EEPROM may be used in place of ROM memory 22.

FIG. 1 further illustrates that influencing device 4 has an interface 26 to an operator control unit, for example, an USB interface to a calibration tool installed on a standard computer. In addition, influencing device 4 also has an interface 28 to an external real-time computer, such as an LVDS interface to a bypass system.

Influencing device 4 also has a debug interface 30, which is also preferably a Nexus debug interface. Alternatively, other debug interfaces, which those skilled in the automotive art refer to by the acronyms AUD, JTAG, NBD, OCDS or SDI, etc., may be used in place of the Nexus interface.

FIG. 1 also illustrates the adaptation unit 6, via which influencing device 4 is connected to control unit 2. As can be seen in FIG. 1, adaptation unit 6 includes SRAM 32, which is connected to a FPGA 34.

The FPGA is connected to a connecting element 38 via a channel section 36A, on which preferably simulated bus signals can be provided, preferably by the FPGA. Connecting element 38, which in a preferred embodiment is implemented within the FPGA, has the switching states S1 and S2 shown in FIG. 1. Switching from a first switching state S1 to a second switching state S2 can be triggered by a trigger signal 40 coming from an access point to microcontroller bus 42 of the control unit microcontroller 8. The trigger signal 40 is preferably extractable from the data stream on the microcontroller bus using a filter element 52 and/or said trigger signal 40 is dependent on the switching state of the control unit microcontroller 8 or of control unit 2 as a whole. The present system, as shown in FIG. 1, enables control unit variables to be calibrated, applied, and read out via debug interface 30 even when control unit 2 is OFF.

Since adaptation unit 6 is interposed between influencing device 4 and the control unit, adaptation unit 6 can indicate an intact Nexus interface to influencing device 4 when control unit 2 is OFF. During switching state S2, the required bus signals are provided by FPGA 34 of the adaptation unit 6, so that the SRAM 32 of the adaptation unit 6 is, or can be, written to via debug interface 30 even when control unit 2 is OFF. Once control unit 2 is turned on, it can access the memory area of SRAM 32 via microcontroller bus 42.

During "normal operation", i.e., when control unit 2 is energized, connecting element 38 switches adaptation unit 6 to first switching state S1, thereby reestablishing the direct link between the control unit and influencing device 4 via Nexus debug interfaces 18, 30.

SRAM 32 can hold the data permanently even when the control unit is OFF. When the control unit is ON, this memory is accessed via microcontroller bus 42 of control unit 2. When control unit 2 is ON, the control unit microcontroller core 8 communicates, inter alia, with debug interface 18 of control unit 2. The data communication taking place via channel sections 36B, 36C between debug interface 18 of control unit 2 and debug interface 30 of influencing device 4 is not influenced by adaptation unit 6 when the control unit is in an ON state, because in this condition the debug data, i.e., the data exchanged between debug interfaces 18, 30, is merely passed through by adaptation unit 6.

When the control unit is OFF, adaptation unit 6 takes over the task of providing the protocol information for the debug channel, which here includes channel sections 36A and 36C. The adaptation unit 6 also permits influencing device 4 to continue to access the data just as if the system were ON. Because of this, data can be prepared while control unit 2 is OFF, and used immediately after control unit 2 is turned on, such as is necessary for cold start applications. If control unit 2 uses SRAM 32 of adaptation unit 6 also for other status data, influencing device 4 can also read out these other status values for purposes of analysis after the control unit 2 is turned off at a later time.

These status values could, for example, be currently recorded sensor data reflecting the state of the system, which is controlled by the control unit, such as engine, brakes, chassis and suspension system, etc. Intermediate results of calculations of the control unit can also be stored in SRAM 32 as status values.

It is also conceivable that other influencing devices, such as a debugger device (e.g., a Lauterbach debugger), could be used in place of the influencing device 4 illustrated in FIG. 1. Depending on the level of implementation of the "simulated" control unit bus, it is possible to provide a greater or smaller number of functions of other influencing devices or, with little modifications, of influencing device 4.

Figure 2:
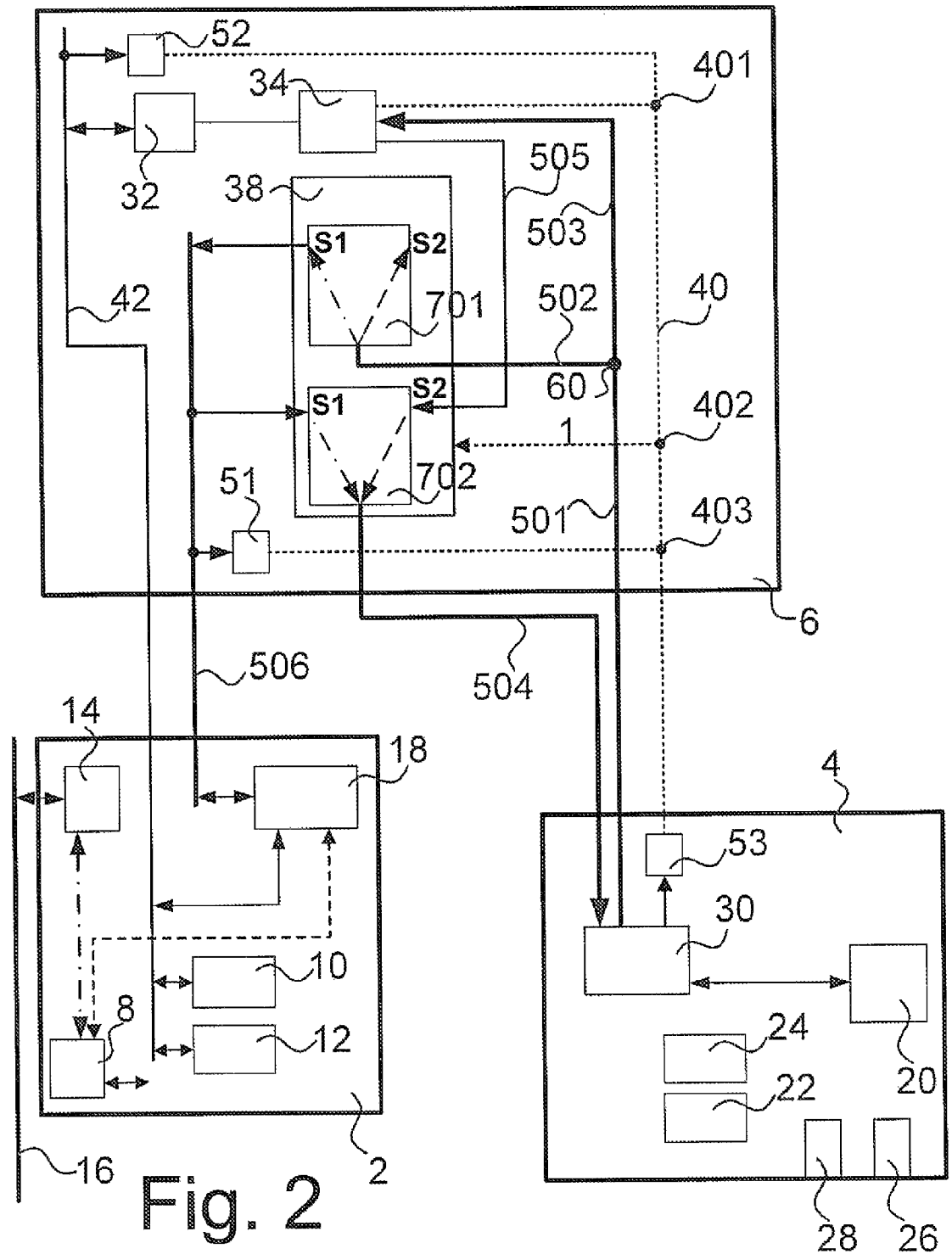
FIG. 2 illustrates a schematic view of a test system according to another embodiment of the present invention.

The following is a detailed description of FIG. 2, which schematically illustrates another embodiment of an adaptation unit 6 according to the present invention. Drawing elements that are not described again in FIG. 2 are equivalent to those having the same reference numerals and shown in FIG. 1.

In the adaptation unit 6 according to FIG. 2, a trigger signal 40 for switching the connecting element 38 can be provided by FPGA 34. FIG. 2 illustrates additional or alternative sources of a trigger signal 40.

Example A

Channel section 506, which runs from debug interface 18 of control unit 2 to connecting element 38 of adaptation unit 6, is connected to a filter element 51 in such a manner that a trigger signal 40 can be extracted from the data stream on channel section 506.

Example B

Among other things, debug interface 30 of influencing device 4 also provides a trigger signal 40, which can be extracted by a filter element 53.

Example C

A trigger signal 40 can be extracted from microcontroller bus 42. The extraction of this signal from the data stream on microcontroller bus 42 is preferably accomplished using a filter element 52.

In the examples A through C, trigger signal 40 ultimately causes the switching of the switching states of connecting element 38.

The data channel between influencing device 4 and adaptation unit 6 is symbolically divided, on the one hand, into channel sections 501, 502, and 503 with a data flow direction away from influencing device 4 and, on the other hand, into a fourth channel section 504 with a data flow direction toward influencing device 4. However, this does not mean that different lines must be used for the two data flow directions, respectively.

Preferably, connecting element 38 is implemented within FPGA 34, and influencing device 4 and adaptation unit 6 are directly connected to FPGA 34 via the bus line system. It is also preferred to use the same bus line system for both the data flow direction from influencing device 4 and the data flow direction toward influencing device 4.

FIG. 2 illustrates a first switching element 701 and second switching element 702, which represent the two main components of connecting element 38, and illustrate the manner in which the different data flow directions interact with the respective switching states of switching element 701 and second switching element 702. In both switching elements 701 and 702, a trigger signal 40 causes a change in the data flow, which is illustrated by the following example.

Initially, the control unit is assumed to be in a non-operational state. Because of this, a trigger signal 40 causes the two switching elements 701 and 702 of connecting element 38 to go to switching state S2. As a result of this switching state, data which is to be transmitted from influencing device 4 to adaptation unit 6 no longer reaches control unit debug interface 18 via second channel section 502 and first switching element 701. It is noted that even if the data could reach the control unit debug interface, it would not be useful anyway, since the control unit is in a non-operational state.

However, in this embodiment, the data of the influencing device is transmitted to FPGA 34 via first channel section 501 and third channel section 503, and protocol data is "replied" by the FPGA to influencing device 4 via fifth channel section 505 and fourth channel section 504. Thus, the communication appears to influencing device 4 as if a connection existed to control unit 2.

When the control unit of the embodiment of FIG. 2 changes to an operational state, then trigger signal 40 causes the two switching elements 701 and 702 of connecting element 38 to go to first switching state S1. This allows data to be transmitted from influencing device 4 to control unit 2 via channel sections 501, 502 and 506. Data transmission in the opposite direction (e.g., from control unit 2 to influencing device 4) can take place via sixth channel section 506 and fourth channel section 504.

Although in first switching state S1, FPGA 34 is not required to send protocol data to the influencing device because control unit 2 itself provides this data when in an operational state, and adaptation unit 6 is primarily intended to merely pass through the data traffic between influencing device 4 and control unit 2, the inventive embodiment of FIG. 2 may provide for the data channel originating from influencing device 4 to branch at a junction point 601. In first switching state S1, the branch at junction point 601 causes the data coming from debug interface 30 of influencing device 4 to be forwarded both to debug interface 18 of control unit 2 and to FPGA 34.

FPGA 34 may be designed such that the switching states of first switching element 701 and/or of second switching element 702 are changed as a function of the transmitted data. For example, in first switching state S1, the data is also transmitted to FPGA 34 via first channel section 501 and third channel section 503.

The dashed line leading from FPGA 34 to a first node 401 and further to connecting element 38 illustrates that a change of a switching state from S1 (i.e., first switching state) to S2 (i.e., second switching state) or vice versa can also be triggered by a trigger signal 40 coming from FPGA 34. This can be an alternative or supplement to providing a trigger signal 40 via microcontroller bus 42.

Reference is also made to additional dashed lines that indicate optional starting points of trigger signals 40 for connecting element 38. As already mentioned, such a signal 40 may originate from debug interface 30 of influencing device 4, and then pass to second node 402, and from there, to connecting element 38. The corresponding dashed line illustrates that, as an alternative, or in addition to, the above-mentioned sources of a trigger signal 40, such a signal may originate from influencing device 4, and more specifically, but not exclusively, from the debug interface 30 thereof.

A switching signal 40 may also be conveyed to a third node 403 from sixth channel section 506 of the bus that connects debug interface 18 of control unit 2 to connecting element 38 of adaptation unit 6, or from debug interface 18 itself. The signal 40 is preferably extractable from the data stream on channel section 506 using the filter element 51. Switching signal 40 passes from third node 403 to connecting element 38, as shown in FIG. 2 by the dashed line leading from third node 403 via second node 402 to connecting element 38.

In an embodiment of the present invention, a separate digital output of control unit 2 can be provided as a possibly additional source of a switching signal 40. Preferably, switching signal 40 is conveyed from the digital output to one of nodes 401, 402, or 403, and from there, passes to connecting element 38.

While the invention has been described in connection with certain embodiments thereof, the invention is capable of being practiced in other forms and using other materials and structures. Accordingly, the invention is defined without limitation by the recitations in the claims appended hereto and equivalents thereof.

What is claimed is:

1. A system for testing and calibrating a control unit including a microcontroller, the system comprising:
    an influencing device; and
    an adaptation unit disposed between the control unit and the influencing device, the adaptation unit including a memory operable to store at least part of a data of a data communication between the influencing device and the control unit, the memory operable to be at least one of read from and written to by the influencing device when the control unit is in an off state so as to continue the data communication by providing protocol data for a debug channel, wherein the adaptation unit includes a connecting element operable to connect the influencing device and the control unit by switching said connection between a direct data link and a data link interposing the memory of the adaptation unit.

2. The system as recited in claim 1, wherein the connecting element is switchable independently of the state of the control unit.

3. The system as recited in claim 1, wherein the connecting element includes at least one programmable unit.

4. The system as recited in claim 3, wherein the connecting element includes a reprogrammable hardware device.

5. The system as recited in claim 1, wherein the connecting element is implemented within an FPGA.

6. The system as recited in claim 1, further comprising a microcontroller bus, and wherein the adaptation unit includes a filter element connected to the microcontroller bus and operable to supply a trigger signal to the connecting element.

7. The system as recited in claim 1, further comprising a filter element, and wherein:
    the influencing device includes a debug interface operable to supply a trigger signal; and
    the filter element is operable to extract the trigger signal so as to supply the extracted trigger signal to the connecting element.

8. The system as recited in claim 1, wherein the connecting element includes a microcontroller device.

9. The system as recited in claim 1, wherein the connecting element includes a circuit including discrete active and passive electronic components.

10. The system as recited in claim 1, wherein the memory of the adaptation unit includes at least one of a SRAM, MRAM, and FRAM device.

11. The system as recited in claim 1, wherein:
    the influencing device includes a first debug interface;
    the control unit includes a second debug interface; and
    the adaptation unit includes a third debug interface corresponding to the first and second debug interfaces and being operable for a data connection to at least one of the influencing device and to the control unit, the adaptation unit indicating an intact debug interface to the influencing device when the control unit is switched off.

12. The system as recited in claim 11, wherein the third debug interface is a NEXUS interface.

13. The system as recited in claim 1, wherein the adaptation unit is an integral part of at least one of the influencing device and the control unit.

14. A method for operating a test system having a control unit and an influencing device connected to the control unit via a data link and used for influencing the control unit, the method comprising the steps of:
providing an external memory that is accessible by the control unit as its own memory;
providing protocol data on a debug channel;
providing at least one of first control data, first payload data, and first instructions on at least one of the data link between the control unit and the influencing device and a data link between an adaptation unit and the influencing device;
establishing a communication between the external memory and the influencing device using at least one of communication protocol data of the control unit and communication protocol data which corresponds to communication protocol data of the control unit, wherein the adaptation unit takes over providing communication protocol data for a debug channel when the control unit is in an off state;
writing at least one of second control data, second payload data, and second instructions for the control unit from the influencing device into the external memory;
starting the control unit while reading the external memory; and
transferring the communication to the control unit and the influencing device;
wherein the adaptation unit is configured for switching said data links between a direct data link between the control unit and the influencing device and a data link interposing the external memory.

15. The method as recited in claim 14, further comprising the step of:
decoupling the external memory from the influencing device after the transferring of the communication to the control unit and the influencing device.

16. The method as recited in claim 14, wherein the external memory is disposed in the adaptation unit.

17. The method as recited in claim 16, wherein the communication is a communication via a respective debug interface of at least one of the control unit, the influencing device, and the adaptation unit.

18. An adaptation unit connected in a data link between a control unit and an influencing device, the adaptation unit comprising:
a memory operable to store at least part of a data of a data communication between the influencing device and the control unit, the memory being operable to be at least one of read from and written to by the influencing device when the control unit is in an off state so as to continue the data communication by providing protocol data for a debug channel; and
a connecting element operable to connect the influencing device and the control unit by switching said data link between a direct data link and a data link interposing the memory of the adaptation unit.

19. The adaptation unit as recited in claim 18, wherein the connecting element is being switchable independently of a state of the control unit.

20. The system as recited in claim 1, wherein the connecting element is switchable based on the state of the control unit.

21. The method as recited in claim 14 further comprising the step of:
causing the adaptation unit to implement a switching state that establishes the direct link between the control unit and the influencing device via a debug interface when the control unit has been started.

22. The system of claim 1 wherein the off state of the control unit comprises a time during activation of the control unit.

23. The adaptation unit of claim 18 wherein the off state of the control unit comprises a time during activation of the control unit.

* * * * *